United States Patent Office 3,201,334
Patented Aug. 17, 1965

3,201,334
PROCESS FOR THE EXTRACTION OF COPPER FROM COPPER ORES
Henri A. I. Ben-Bassat, Bet-Hakerem, Jerusalem, Israel, assignor to Yissum Research Development Company, Jerusalem, Israel, a company of Israel
No Drawing. Filed July 2, 1963, Ser. No. 292,474
4 Claims. (Cl. 204—108)

It is an object of the present invention to provide a process for the extraction of copper from copper ores. It is a further object of the present invention to provide a novel method for the extraction of copper from ores containing substantial quantities of other metals. It is a further object of the present invention to provide a method for the production of concentrates containing a high percentage of copper and only minor quantities of other metals, such as iron and the like. It is still a further object of the present invention to provide a method for the extraction of copper from ores containing substantial quantities of other cations, characterized in that a substantial part of the extracting agent can be recovered and used for extracting further batches of ore. Other objects of the invention will become apparent hereinafter.

It is known that metals form chelates with compounds such as dioximes and certain diketones. I have now found that under certain defined conditions, acetyl-acetone (2,4-pentane-dione) can be used for the selective separation of copper from ores and solutions containing copper in admixture with other cations. I have found that at a low pH (about pH 1 to 2), there is formed a soluble chelate of copper acetyl acetonate containing two molecules of 2,4-pentane-dione per atom of copper, which can be precipitated when the pH is increased to about pH 3 to 5. At this higher pH chelates of other cations remain in solution, resulting in a substantially pure precipitate of copper-acetyl-acetonate.

The precipitated chelate can be filtered off, shipped as such, or it can be dissolved and electrolyzed so as to yield directly metallic copper.

In the industrial production of copper, as carried out for example in Timna, the location of the Israel copper mines in the southern desert of that country, the ores are concentrated to a stage where the concentrate contains about 20 percent by weight of copper, in addition to substantial quantities of iron, and which is exported as such. According to the present invention, concentrates containing substantially higher percentages of copper, and which are substantially free from iron, can be easily produced.

According to the present invention the copper ore can be extracted with acetyl-acetone or it can be precipitated from a solution obtained by first treating the crushed ore with sulfuric acid. There is obtained a solution of metal chelates, which remain in solution at low pH (in the range of about between pH 1 to 2). To this acid solution there is added a suitable quantity of an alkali, so as to increase the pH to such a value at which there takes place a selective precipitation of copper acetyl acetonate. This selective precipitation takes place at a pH of about 3, and preferably within the rather wide range of pH 3 to 5. At this higher pH the copper acetyl acetonate is precipitated, while the other cations remain in solution.

The precipitated copper chelate can be filtered off; it is a stable solid compound which may be shipped as such. It is also possible to add to the solid chelate a corresponding quantity of aqueous copper sulfate, resulting in the formation of a solution of a copper acetyl-acetonate complex containing 1 molecule acetyl-acetone per atom of copper. This green solution can be directly subjected to electrolysis.

The solid copper chelate can be treated with mineral acid so as to result in a solution of the copper salt and in the release of free acetyl-acetone, which can be easily separated and used for chelating subsequent batches of ore. The major part of the organic agent can be recovered.

In order that a better understanding may be had of the invention, it will now be exemplified by means of the following examples, which are to be construed in an illustrative and non-restrictive manner.

The experiments were carried out with copper ore containing about 1 percent by weight of copper, and with solutions prepared from appropriate metal salts. The ore was crushed to about 90 mesh and this was used as starting material.

Example 1

A quantity of 1000 g. of the above copper ore was mixed with 100 g. of 35° Bé. sulfuric acid and 400 ml. $H_2O$, i.e. about 100 g. sulfuric acid of 35° Bé, per 10 g. of copper contained in the ore.

The solution was filtered off and 30 g. of technical acetyl-acetone, about 96 percent was added with stirring to the filtrate at ambient temperature. There was obtained a green solution of a pH of about 1. To this solution there was added a quantity of aqueous caustic soda so as to adjust the pH to about 4. A precipitate was formed, consisting of copper di-(acetyl-acetonate). About 40 g. of copper chelate was obtained, containing about 24 percent copper by weight.

Example 2

To 1000 g. of the above ore there was added at ambient temperature 60 g. of acetyl-acetone and 1000 g. of 2 percent sulfuric acid. This quantity of acid is sufficient when no alkalies are present in the ore.

After stirring during about 15 minutes, the solid residue was filtered off. To the filtrate there was added 20 ml. of 30 percent aqueous sodium hydroxide, resulting in a pH of about 3.5. The copper chelate was precipitated, while the other cations remained in solution.

The precipitate was filtered off, washed with water and dried. A quantity of about 40 g. of copper di-(acetyl-acetonate) was obtained. A quantity of 500 g. sulfuric acid (60° Bé.) was added with stirring, resulting in an aqueous phase of copper sulfate in sulfuric acid, which may be subjected to electrolysis, and in an organic phase of acetyl-acetone, which may be used for subsequent batches.

Example 3

A quantity of 500 g. copper di-(acetyl-acetonate) was stirred with a quantity of 500 ml. of aqueous copper sulfate ($CuSO_4 \cdot 5H_2O$). A green solution of copper mono-acetyl-acetonate was obtained. This can be electrolyzed, resulting in metallic copper and in recovered acetyl-acetone. Acetyl acetone sequestered by other cations can be liberated by acid or basic hydrolysis.

Example 4

1.5 g. of $Cu(NO_3)_2$ was dissolved in 50 ml. of water, together with 5 g. of each of the following salts: $Fe(NO_3)_3$, $Al(NO_3)_3$, $Cr(NO_3)_3$, $Ni(NO_3)_2$ and $Zn(NO_3)_2$. Aqueous sodium hydroxide was added to raise the pH to about 4.0 after addition of acetyl-acetone. The copper acetyl acetonate was precipitated and separated by simple filtration. The other cations remained in the form of soluble chelates. No adsorption or co-precipitation was observed.

As the boiling point of acetyl-acetone is above 130° C., it has a rather low vapor pressure at ambient temperature and can be recovered without substantial losses.

What I claim is:

1. In a process for the production of copper from copper ores containing other metals, the steps comprising leaching copper ore by contacting the ore with aqueous sulfuric acid and acetyl-acetone at a pH between 1 and 2; separating leach solution containing copper from the ore residue; adding sufficient alkali to adjust the pH of the leach solution to between 3 and 5 to precipitate solid copper diacetylacetonate from the leach solution; and separating the precipitate from the solution.

2. In a process for the production of copper from copper ores containing other metals, the steps comprising leaching copper ore by contacting the ore with aqueous sulfuric acid and acetyl-acetone at a pH between 1 and 2; separating leach solution containing copper from the ore residue; adding sufficient aqueous alkali metal hydroxide to adjust the leach solution to a pH of 3 to 5 to precipitate solid copper-diacetyl-acetonate; and separating the resultant precipitate from the leach solution.

3. A process for the production of copper from copper ores containing other metals, which comprises the steps of leaching copper ore with sulfuric acid and acetyl-acetone at a pH between 1 and 2; separating leach solution containing copper from the ore residue; adding sufficient alkali to adjust the leach solution to a pH of 3 to 5 to precipitate solid copper acetyl-acetonate; separating solid copper acetyl-acetonate from the leach solution; adding a strong mineral acid to the solid so as to obtain a pH of between 0 and 1 to decompose the chelate complex into an aqueous phase containing the copper in ionic form and an organic phase of acetyl acetonate.

4. A process for the production of copper from copper ores containing other metals, which comprises the steps of leaching copper ore with sulfuric acid and acetyl-acetone at a pH between 1 and 2; separating leach solution containing copper from the ore residue; adding sufficient alkali to adjust the leach solution to a pH of from 3 to 5 to precipitate solid copper acetyl-acetonate; separating solid copper acetyl-acetonate from the leach solution; adding aqueous copper sulfate to the solid to obtain a solution of copper acetyl-acetonate containing one molecule acetyl-acetonate per atom copper; and subjecting this solution to electrolysis to obtain copper and to recover acetyl-acetone.

No references cited.

JOHN H. MACK, *Primary Examiner.*

MURRAY TILLMAN, WINSTON A. DOUGLAS,
*Examiners.*